United States Patent
Skog et al.

(10) Patent No.: US 10,805,824 B2
(45) Date of Patent: Oct. 13, 2020

(54) NETWORK NODE AND A METHOD OF A NETWORK NODE OF CONTROLLING DATA PACKET DELIVERY TO A MOBILE TERMINAL IN CASE OF DATA RATE THROTTLING AFTER HAVING REACHED A DATA DOWNLOAD CAP

(71) Applicant: Telefonaktiebolaget L M Ericsson (publ), Stockholm (SE)

(72) Inventors: Robert Skog, Hässelby (SE); Anders Axelsson, Sundyberg (SE); Johan Kölhi, Vaxholm (SE); Thorsten Lohmar, Aachen (DE); Dan Mathiasen, Nacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 393 days.

(21) Appl. No.: 14/769,223

(22) PCT Filed: Feb. 22, 2013

(86) PCT No.: PCT/EP2013/053534
§ 371 (c)(1),
(2) Date: Aug. 20, 2015

(87) PCT Pub. No.: WO2014/127827
PCT Pub. Date: Aug. 28, 2014

(65) Prior Publication Data
US 2016/0007224 A1 Jan. 7, 2016

(51) Int. Cl.
*H04W 28/02* (2009.01)
*H04W 52/02* (2009.01)
(Continued)

(52) U.S. Cl.
CPC ......... *H04W 28/0221* (2013.01); *H04L 47/14* (2013.01); *H04L 49/90* (2013.01);
(Continued)

(58) Field of Classification Search
CPC ......... H04W 28/0221; H04W 52/0212; H04W 72/048; H04W 76/048; H04L 47/14; H04L 49/90; H04L 47/25
See application file for complete search history.

(56) References Cited

U.S. PATENT DOCUMENTS

| 2003/0152107 A1* | 8/2003 | Pekonen | H04H 20/28 370/473 |
| 2007/0189163 A1* | 8/2007 | Ozawa | H04L 47/39 370/230 |

(Continued)

FOREIGN PATENT DOCUMENTS

| EP | 2237600 A1 | 10/2010 |
| WO | 2013176591 A1 | 11/2013 |

OTHER PUBLICATIONS

Korhonen, Jari et al., "Power-Efficient Streaming for Mobile Terminals", Nossdav, Stevenson, Washington, USA, Jun. 3-14, 2005, 39-44.
(Continued)

*Primary Examiner* — Lonnie V Sweet
(74) *Attorney, Agent, or Firm* — Murphy, Bilak & Homiller, PLLC (57) ABSTRACT

The present invention relates to a network node (14, 18, 21) and a method of a network node of controlling data delivery to a mobile terminal (11, 12, 13) in case of data rate throttling after having reached a data download cap. The method comprises the steps of acquiring (S101) the data to be delivered to the mobile terminal, receiving (S102) an indication that a data download cap for the mobile terminal has been reached, and buffering (S103) the acquired data.
(Continued)

The method further comprises the step of delivering (S104) the buffered data to the mobile terminal in bursts.

8 Claims, 7 Drawing Sheets

(51) Int. Cl.
 *H04W 72/04* (2009.01)
 *H04L 12/801* (2013.01)
 *H04L 12/861* (2013.01)
 *H04W 76/28* (2018.01)
 *H04L 12/825* (2013.01)

(52) U.S. Cl.
 CPC ..... *H04W 52/0212* (2013.01); *H04W 72/048* (2013.01); *H04W 76/28* (2018.02); *H04L 47/25* (2013.01); *Y02D 70/00* (2018.01); *Y02D 70/1242* (2018.01); *Y02D 70/1262* (2018.01); *Y02D 70/24* (2018.01)

(56) References Cited

U.S. PATENT DOCUMENTS

| | | |
|---|---|---|
| 2007/0254628 A1 | 11/2007 | Rybak |
| 2008/0291855 A1 | 11/2008 | Bata et al. |
| 2009/0170556 A1* | 7/2009 | Yamasaki ............... H04L 47/10 455/552.1 |
| 2012/0157038 A1* | 6/2012 | Menezes ................. H04W 4/26 455/405 |
| 2012/0176941 A1 | 7/2012 | Bata et al. |
| 2014/0112405 A1* | 4/2014 | Jafarian ............... H04B 7/0413 375/267 |

OTHER PUBLICATIONS

Mohapatra, Shivajit et al., "Integrated Power Management for Video Streaming to Mobile Handheld Devices", MM'03, ACM Multimedia, Berkeley, California, USA, Nov. 2-8, 2003, 1-10.

* cited by examiner

NETWORK NODE AND A METHOD OF A NETWORK NODE OF CONTROLLING DATA PACKET DELIVERY TO A MOBILE TERMINAL IN CASE OF DATA RATE THROTTLING AFTER HAVING REACHED A DATA DOWNLOAD CAP

TECHNICAL FIELD

The invention relates to a method of a network node of controlling data to be delivered to a mobile terminal, as well as a network node configured to control data to be delivered to the mobile terminal.

BACKGROUND

Mobile operators offer subscriptions for mobile Internet where the total amount of data that a subscriber can download during a predetermined period is restricted. This is known as download quota. For instance, a subscription may specify that 10 GB can be downloaded at high speed during one month, and once this fixed download cap has been reached, the subscriber downloads data at a much lower rate, e.g., 64 kB/s, until the turn of the month when the subscriber again is assigned full rate.

When the download rate is throttled in this manner, load on the Radio Access Network (RAN) to which the mobile terminal, being, e.g., a User Equipment (UE), is connected decreases as compared to full-rate transmissions in the RAN. However, as will be described in more detail in the following, steady and continuous low-rate transmissions (at, e.g., 64 kB/s) will still have great impact on resource consumption in the RAN and the UE, such as processing load and memory allocation in the radio nodes, UE power consumption, and allocated radio resources.

In 3GPP wireless technologies, for example Global System for Mobile communications (GSM), Universal Mobile Telecommunication System (UMTS), and Long Term Evolution (LTE), the Radio Resource Control (RRC) protocol handles the control plane signaling of Layer 3 between the UEs and the RAN, i.e. the network residing between the UEs and core network. In UMTS, the RAN comprises the NodeBs and Radio Network Controllers (RNCs).

The RRC protocols include for example:
Functions for connection establishment and release,
Broadcast of system information,
Radio bearer establishment/reconfiguration and release,
RRC connection mobility procedures,
Paging notification and release,
Outer loop power control.

Figure 1:
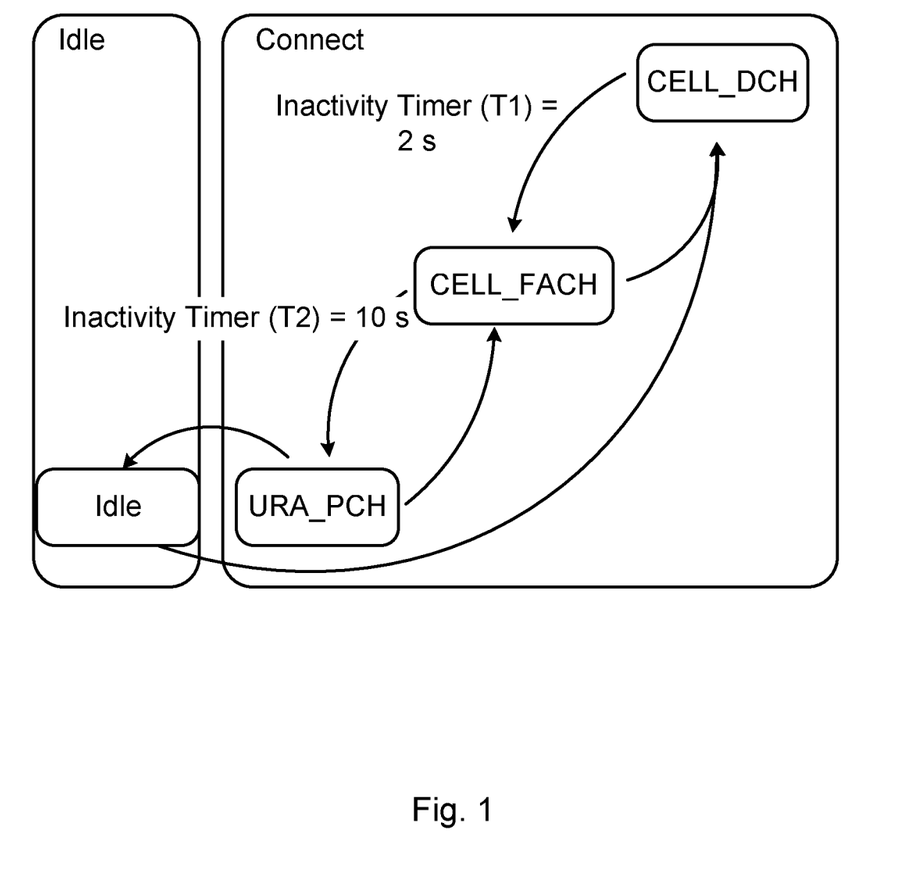
FIG. 1 exemplifies the different communication states and the transitions between the states in a UMTS network.

In order to transmit/receive data to/from a mobile terminal such as a UE, the UE needs to have an established RRC connection. When in RRC connected mode, the UE may operate in different communication states. In 3GPP, these communication states are referred to as RRC states. FIG. 1 exemplifies the different communication states and the transitions between the states in a UMTS network. Inactivity for a certain time, which is determined by a timer, in a connected state generally results in transition to a less resource consuming state, while activity results in transition to a higher state in which more resources are required by the UE and the RAN. In general, communication states which provide the UE with a higher data rate require more resources, and vice versa, as is illustrated in FIG. 1. The signals used to effect transitions from one state to another are generally referred to as radio bearer reconfiguration signals in UMTS, and radio bearer setup/release signals in LTE.

The configuration of RRC inactivity timers in UMTS (and in LTE) networks has great impact on resource consumption in the RAN and the UE. The RRC idle mode (i.e., no connection) results in the lowest power consumption of the UE. In UMTS, the states in the RRC connected mode are, in order of decreasing resource consumption, CELL_DCH (Dedicated Channel), CELL_FACH (Forward Access Channel), CELL_PCH (Cell Paging Channel) and URA_PCH (URA Paging Channel). The power consumption in the CELL_FACH is roughly 50% of that in CELL_DCH, and the PCH states use about 1-2% of the power of the CELL_DCH state.

The transitions to less resource consuming states occur when inactivity timers trigger. The inactivity timers are typically configured by the operators. The latency in the system also increases in the lower states; it takes some time to reach higher states. There is further a cost associated with communication state transitions, with respect to UE management undertaken by, e.g., an RNC, a Base Station Controller (BSC), an eNodeB, etc., whichever of these network elements handles the transitions, implying that the inactivity timers are set such that it should be worthwhile to change the state.

In order to decrease power consumption in the UE and system resources in the RAN, while the UE is in connected mode, there are functions like Discontinuous Reception (DRX) and Transmission. The RAN determines, generally at setup, periods when the UE is permitted to turn off its receiver, transmitter, or both, in defined intervals when there is no data transmission. For example, in a UMTS network, by allowing the UE to stay inactive in CELL_DCH state for longer time periods, the UE can restart transmission after a period of inactivity with a much shorter delay than would be necessary when switching state from CELL_FACH or URA_PCH or re-establishment of a new connection. This will also facilitate a reduction of the number of state transitions between CELL_FACH, CELL_DCH, and Idle. Discontinuous Reception is also available in LTE networks where the period in the connected state normally is longer than in UMTS networks. In LTE there are two different modes of DRX, short and long DRX mode.

Thus, even though the transmission rate in the RAN decreases when the download cap is reached, there is still a steady and continuous flow of data to the UE. This has as an effect that the UE typically will not be allowed to transit from CELL_DCH to a lower state or to switch to DRX mode.

SUMMARY

An object of the present invention is to solve, or at least mitigate these problems in the art and provide an improved method and network node for controlling data to be delivered to a mobile terminal.

This object is attained in a first aspect of the present invention by a method of a network node of controlling data to be delivered to a mobile terminal. The method comprises the steps of acquiring the data to be delivered to the mobile terminal, receiving an indication that a data download cap for the mobile terminal has been reached, and buffering the acquired data. The method further comprises the step of delivering the acquired data to the mobile terminal in bursts.

This object is attained in a second aspect of the present invention by a network node arranged to control data to be delivered to a mobile terminal. The network node comprises a processing unit being arranged to acquire the data to be delivered to the mobile terminal, receive an indication that a data download cap for the mobile terminal has been reached, and buffer the acquired data. The processing unit is further arranged to deliver the buffered data to the mobile terminal in bursts.

Advantageously, an indication that the data download cap for the subscription associated with the mobile terminal has been reached is received at the network node configured to deliver burst data to the mobile terminal, the network node being embodied, e.g., by an RNC, an RBS, an eNodeB, a NodeB, BSC, a proxy server, an HTTP server, etc. The mobile terminal is for instance a UE such as a mobile phone, a personal digital assistant (PDA), a smart phone, a tablet, a laptop, etc., or even a small base station communicating within a cell. Burst data implies a data transmission being interrupted at intervals. Thus, burst data comprises a sequence of bursts, where consecutive bursts are separated by a period of inactivity. The indication implies that the operator will throttle the rate with which the mobile terminal using the particular subscription will be able to download further data until the next-full-rate period commences. When the download cap is reached, the network node will buffer the acquired data and subsequently process the buffered data to be delivered in bursts to the mobile terminal. Thus, the acquired data, which continuously is received by the network node at rate that is much lower than the maximum rate with which data ideally can be transmitted as long as the download cap is not reached, is buffered at the network node and delivered to the mobile terminal in bursts. Consequently, radio resources are utilized more effectively as compared to an even data stream delivered to the mobile terminal at the limited rate.

When transmitting data in bursts, the average transmission rate is the same, but due to buffering, the data is delivered with some latency. However, with a longer period of inactivity between bursts, the mobile terminal can transit to DRX mode or to a less resource-consuming state (for instance from CELL_DCH to CELL_FACH) between bursts. Advantageously, this will reduce resource consumption in the mobile terminal and the RAN.

In a further embodiment of the invention, in case the acquired data pertains to separate communication sessions, the delivered bursts are synchronized such that the delivered bursts of a first of the separate communication sessions at least partially overlap with the bursts of at least a second of the separate communication sessions. Advantageously, by having the bursts of at least two sessions at least partially overlap, less resources are consumed at the mobile terminal, since the mobile terminal can receive bursts of separate sessions simultaneously, implying that there is a greater chance that the mobile terminal can transit to a less resource-consuming state in the periods of inactivity, as compared to a situation where the bursts of the different sessions would not be synchronized.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

As previously has been discussed, FIG. 1 exemplifies the different communication states and the transitions between the states in a UMTS network, where a UE transits between three different states in connected mode, CELL_DCH, CELL_FACH and URA_PCH, and an Idle state in idle mode. Inactivity for a certain time, which is determined by a timer, in a connected state generally results in transition to a lower state, while activity results in transition to a higher state, and greater resources are assigned to the UE when it resides in the higher state. With reference to FIG. 1, this is illustrated by means of inactivity timer T1 which is set to 2 seconds, i.e., if there is no activity for 2 s when the mobile terminal is in state CELL_DCH, it will be moved to state CELL_FACH, and inactivity timer T2 which is set to 10 seconds, i.e. if there is no activity for 10 s when the mobile terminal is in state CELL_FACH, it will be moved to state URA_PCH. As is illustrated in FIG. 1, the higher the state, the more resources are assigned to the mobile terminal (and the device controlling the mobile terminal, e.g., an RNC). Consequently, the higher the state, the higher the resource consumption, e.g., UE battery power and radio resources, in the RAN.

With further reference to FIG. 1, even though it is not shown in the figure, it should be noted that transitions to the previously mentioned DRX communication states are possible. In UMTS, for reducing power consumption, the mobile terminal is in idle mode not required to continuously listen to the information provided by the network; the mobile terminal is set in the DRX state, thereby increasing battery lifetime. In LTE, DRX can be used even in connected mode instead of transitioning to CELL_FACH or URA_PCH. Further, in LTE, the DRX cycles are provided for the mobile terminal; long and short DRX. The long DRX cycle is used during the inactivity periods of the mobile terminal, when the terminal only has to check control channels and no resources are assigned. When data activity is detected, a transition to the short DRX cycle is triggered, thus increasing the responsiveness and connectivity of the mobile terminal.

Figure 2:
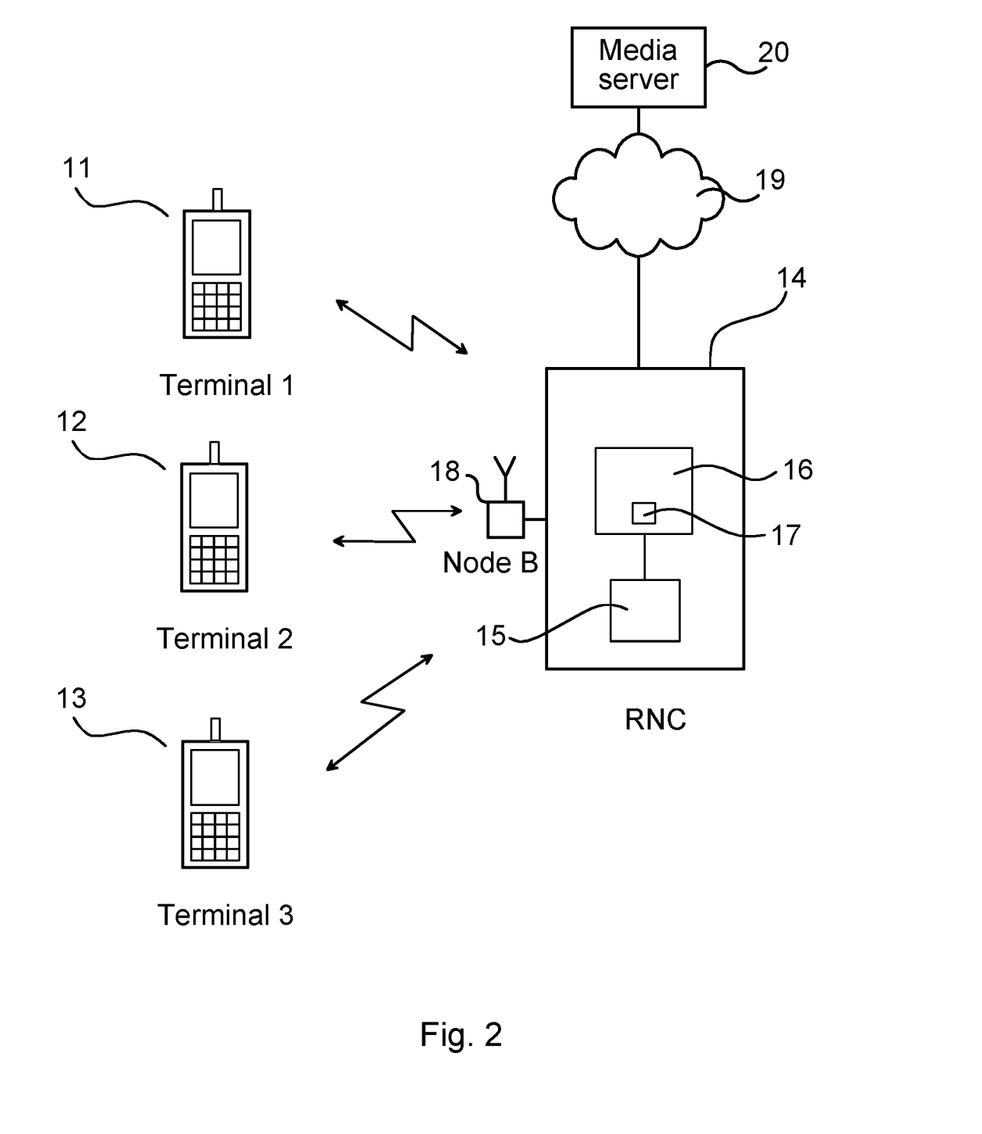
FIG. 2 illustrates a group of mobile terminals communicating with a device according to embodiments of the invention for controlling data to be delivered to one or more of the mobile terminals.

FIG. 2 illustrates a group of mobile terminals 11, 12, 13 communicating with a device according to embodiments of the invention for controlling data to be delivered to one or more of the mobile terminals, which device may, e.g., be a NodeB, an eNodeB, an RNC, a BSC, a proxy server, etc. As exemplified in FIG. 2, the controlling of data to be delivered to one or more of the mobile terminals 11, 12, 13 undertaken in different embodiments of the method of the invention is managed by the RNC 14. In practice, the controlling is performed by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a floppy disk or a memory stick. As a further alternative, the computer program 17 may be downloaded to the storage medium 16 over a network. The processing unit 15 may alternatively be embodied in the form of an application specific integrated circuit (ASIC), a field-programmable gate array (FPGA), a complex programmable logic device (CPLD), etc. The RNC 14 communicates with one or more NodeBs 18 which in their turn communicates via wireless links with the mobile terminals 11, 12, 13. The RNC 14 and the NodeB 18 form the RAN. Further, the RNC 14 is connected via a Core Network (CN) to the Internet 19 and/or to a media server 20.

Figure 3:
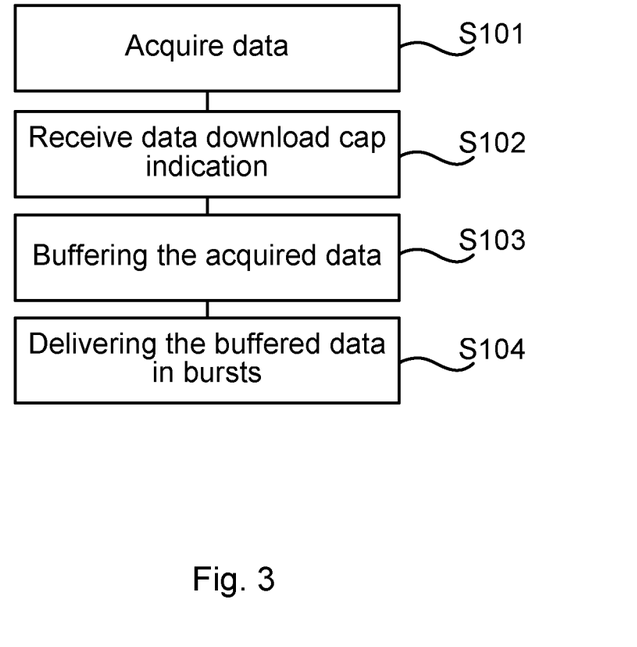
FIG. 3 shows a flowchart of a method according to an embodiment of the invention.

In order to avoid having a mobile terminal reside in a high-level state such as CELL_DCH while receiving a steady and continuous stream of low-rate data, an embodiment of a method according the invention is proposed, a flowchart of which is shown in FIG. 3. Reference is further made to FIG. 2. In a first step, S101, the processing unit 15 of the RNC 14 acquires data to be delivered to a mobile terminal 11 from, e.g., the media server 20 via the Internet 19. In a second step S102, the RNC 14 receives an indication that a data download cap for the mobile terminal 11 has been reached. Such an indication may be provided by the operator with which the subscription associated with the mobile terminal is registered. The telephone number of the Subscriber Identity Module (SIM) card of the mobile terminal 11, also referred to as Mobile Subscriber Integrated Services Digital Network-Number (MSISDN), uniquely identifies a subscription in a GSM or a UMTS mobile network. The subscription can alternatively be identified by means of the International Mobile Subscriber Identity (IMSI). Thereafter, in step S103, the acquired data is buffered in the memory 16 of the RNC 14. Finally, in step S104, the buffered data is delivered to the mobile terminal 11 in bursts.

Figure 4:
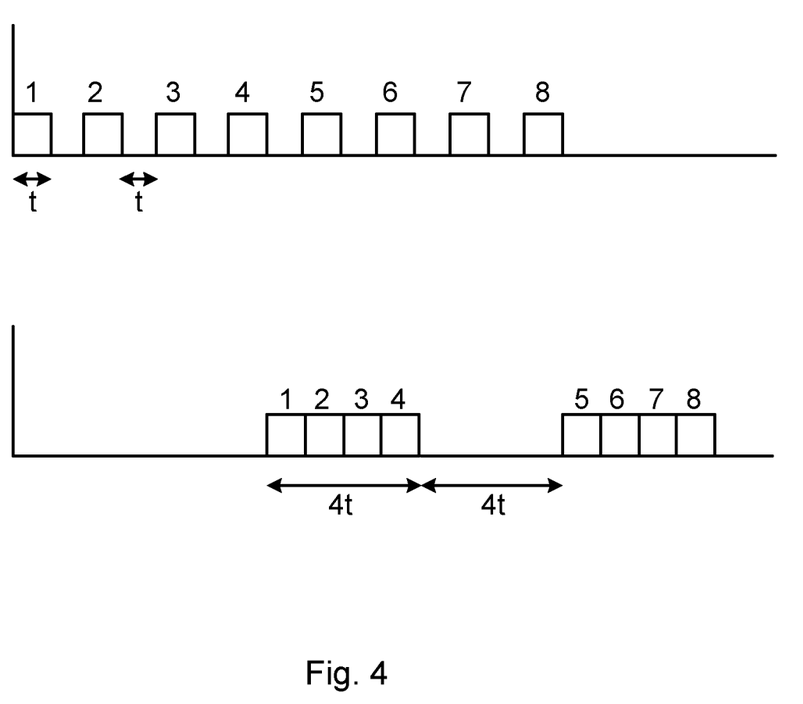
FIG. 4 illustrates how burst data can be configured at a network node according to an embodiment of the invention.

FIG. 4 illustrates how the burst data can be configured. In the upper graph of FIG. 4, eight evenly spread packets of data are shown, numbered 1-8. These are received by the RNC (or any other appropriate network node at which the present invention is implemented), which buffers the acquired data packets for subsequent delivery to the mobile terminal. In this particular example, after four packets 1-4 have been received and buffered, a first burst comprising packets 1-4 is delivered to the mobile terminal as is illustrated in the lower graph of FIG. 4. Thereafter, another four packets 5-8 are received and buffered and subsequently delivered to the mobile terminal in a second burst.

As is shown in the upper graph of FIG. 4, for the continuous stream of data sent from the media server to the RNC, the time period of transmission inactivity for the stream of data is t. In the method according to embodiments where bursts are used, the period of inactivity is typically longer. With reference to the lower graph, when delivering burst data to the mobile terminal, the period of inactivity is four times longer (4 t). The transmission rate is the same, but due to buffering, the data is delivered with some latency. However, with the longer period of inactivity, the mobile terminal can transit to DRX mode or to a less resource-consuming state (for instance from CELL_DCH to CELL_FACH) between bursts. Advantageously, this will consume less resources in the mobile terminal and the RAN.

Thus, in an embodiment of the present invention, the buffered data is configured by the RNC such that at least two buffered data subsets are concatenated to form a burst to be delivered to the mobile terminal, thereby creating longer burst and longer periods of inactivity between subsequent bursts. Advantageously, the network node controlling data to be delivered to the mobile terminal carefully controls the period of inactivity between bursts in order to control the transition between states in the mobile terminal and thus reduce resource consumption.

Figure 5:
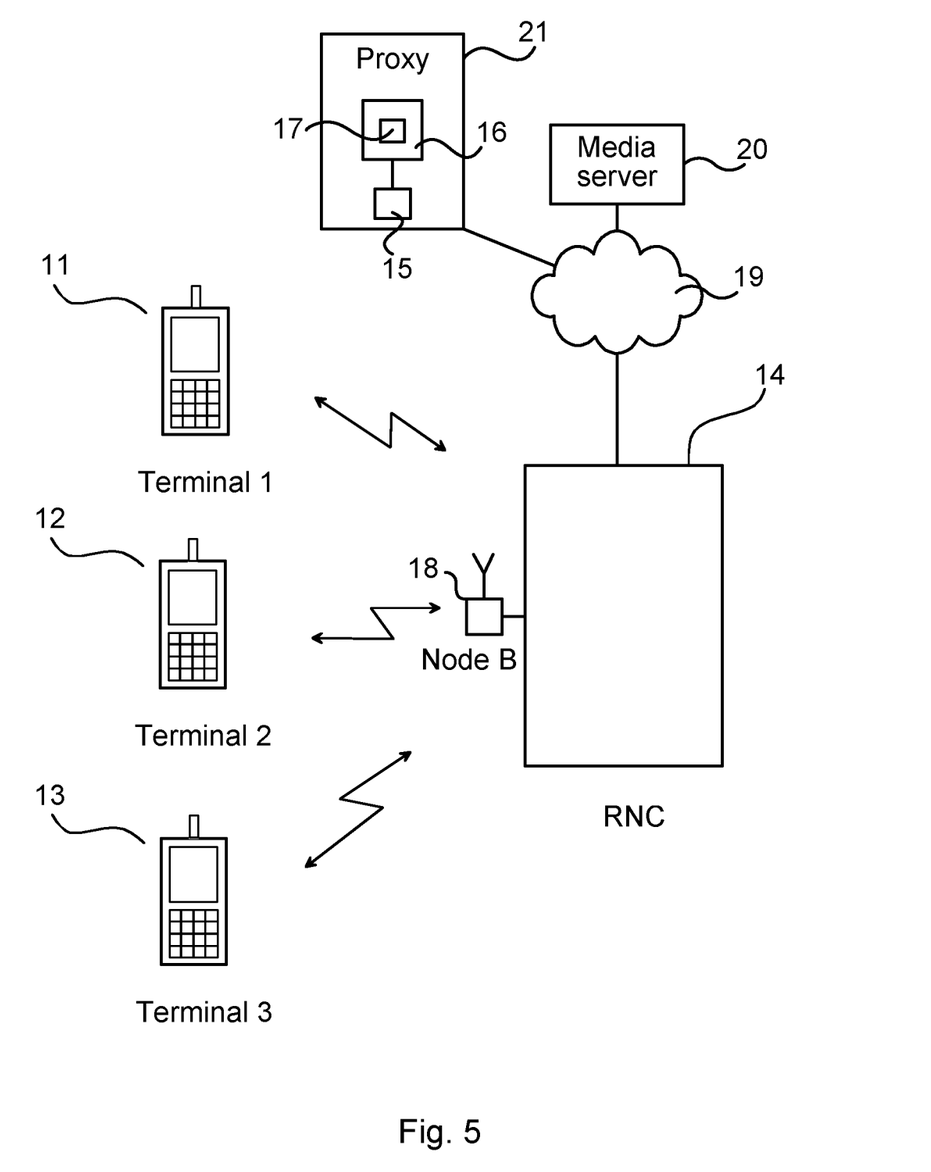
FIG. 5 illustrates a further embodiment of the invention where controlling of data to be delivered to one or more of the mobile terminals is undertaken at a proxy server.

FIG. 5 illustrates a further embodiment of the present invention where controlling of data to be delivered to one or more of the mobile terminals 11, 12, 13 is undertaken at proxy server 21 communicating with the RNC 14 and the media server 20 via the Internet 19. Similar to the embodiment illustrated with reference FIG. 2, the controlling of data to be delivered to one or more of the mobile terminals 11, 12, 13 is performed by a processing unit 15 embodied in the form of one or more microprocessors arranged to execute a computer program 17 downloaded to a suitable storage medium 16 associated with the microprocessor.

Figure 6:
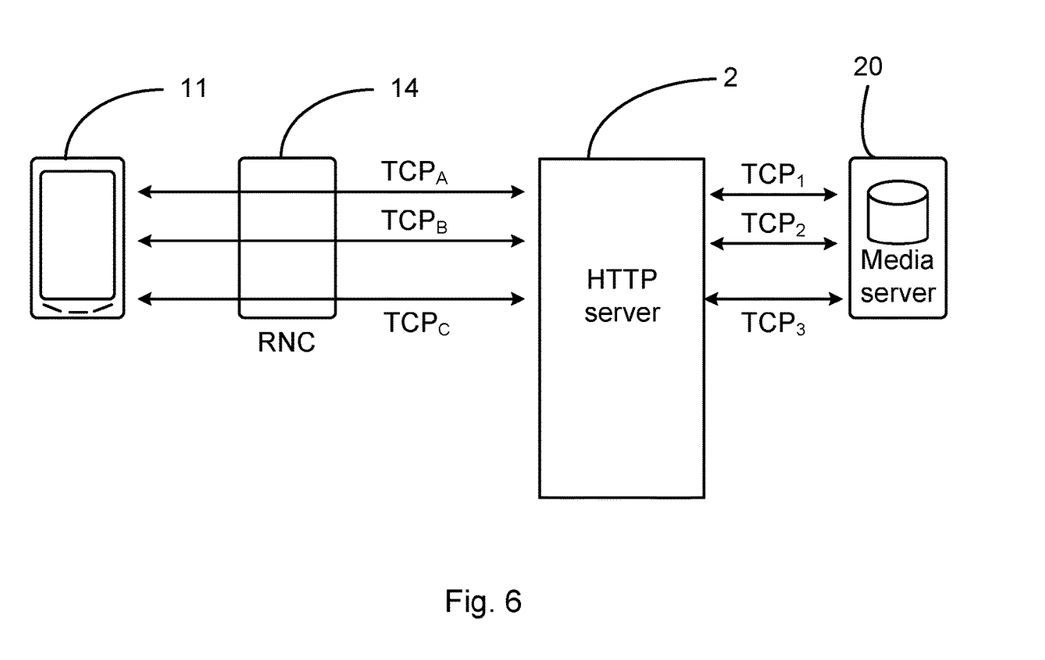
FIG. 6 shows another embodiment of the invention where bursts from separate communication sessions are synchronized.

FIG. 6 shows another embodiment of the invention where the RNC 14 communicates with a device such as an HTTP proxy or an HTTP server 21, which in turn communicates with a media server 20 from which the HTTP server receives data to be distributed in a RAN. The media server 20 may store and distribute digital content in the form of, e.g., videos, audio and images. In this particular exemplifying embodiment, three separate TCP sessions (TCP1, TCP2, TCP3) are setup between the HTTP server 21 and the media server 20 and corresponding TCP sessions TCPA, TCPB, TCPC are setup between the HTTP server 21 and the RNC 14 and NodeB 18 for delivering content data to an end-user in the form of the mobile terminal 11. As discussed in connection to previous embodiments of the present invention, in case an indication that a data download cap has been reached for the mobile terminal 11 is received by the HTTP server 21, and data consequently is transmitted at a lower rate, the data acquired by the HTTP server 21 is buffered for subsequent burst transmission to the mobile terminal 11 via the RNC 14 and the NodeB 18.

Figure 7:
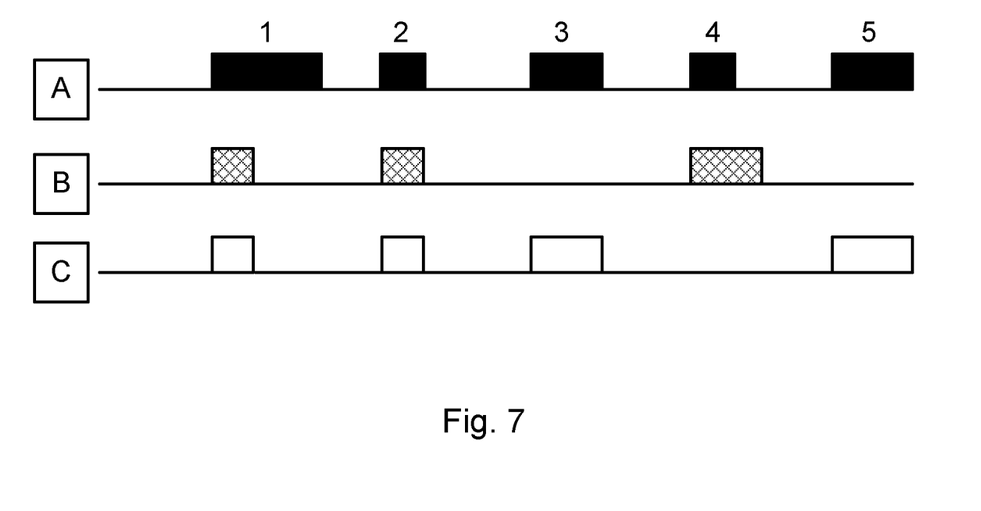
FIG. 7 illustrates the burst data transmitted to the mobile terminal of the embodiment shown in FIG. 6.

Reference is made to FIG. 7 illustrating the burst data transmitted to the mobile terminal 11 via the RNC 14 and the NodeB 18 in this particular embodiment. As can be seen, the HTTP server 21 synchronizes the data to be delivered to the mobile terminal 11 from the separate communication sessions TCP1, TCP2, TCP3. The delivered bursts are synchronized such that the delivered bursts of a first of the separate communication sessions at least partially overlap with the bursts of at least a second of the separate communication sessions.

Thus, a first burst of the first session TCPA overlaps with a first burst of the second session TCPB and the third session TCPC, a second burst of the first session TCPA overlaps with a second burst of the second session TCPB and the third session TCPC, and a third burst of the first session TCPA overlaps with a third burst of the third session TCPC. Further, a fourth burst of the first session TCPA overlaps with a third burst of the second session TCPB, and a fifth burst of the first session TCPA overlaps with a fourth burst of a fifth session TCPC. Advantageously, by having this overlap of bursts of at least two sessions at a time, less resources are consumed at the mobile terminal, since the mobile terminal can receive bursts of separate sessions simultaneously, implying that there is a greater chance that the mobile terminal can transit to a less resource-consuming state compared to a situation where the bursts of the different sessions would not be synchronized.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method by a network node of controlling data to be delivered to a mobile terminal, the method comprising:
   receiving an indication that a data download cap has been reached in a current download quota period, for a subscription associated with the mobile terminal; and
   responsive to receiving the indication, throttling further data downloads to the mobile terminal during a remaining portion of the current quota period, based on:
      buffering data received for delivery to the mobile terminal;
      delivering the buffered data to the mobile terminal in bursts; and
      controlling the period between the bursts in order to control transition by the mobile terminal into a lower-power state of operation between the bursts.

2. The method according to claim 1, further comprising:
   synchronizing, in case the data pertains to separate communication sessions, the bursts such that the bursts of a first of the separate communication sessions at least partially overlap with the bursts of at least a second of the separate communication sessions.

3. The method according to claim 1, wherein the step of delivering the buffered data to the mobile terminal in bursts comprises accumulating data received for the mobile terminal in the buffer to form bursts of a desired length, and, to control the period between bursts, concatenating at least two buffered data subsets to form a burst to be delivered to the mobile terminal.

4. A network node for controlling data to be delivered to a mobile terminal, the network node comprising:
   memory storing a computer program comprising program instructions; and
   a processing circuit configured to execute the program instructions, whereby the processing circuit is configured to:
      receive an indication that a data download cap has been reached in a current quota period, for a subscription associated with the mobile terminal; and
      responsive to receiving the indication, throttle further data downloads to the mobile terminal during a remaining portion of the current quota period, based on being configured to:
         buffer data received for delivery to the mobile terminal;
         deliver the buffered data to the mobile terminal in bursts; and
         control the period between the bursts in order to control transition by the mobile terminal into a lower-power state of operation between the bursts.

5. The network node according to claim 4, the processing circuit further being configured to:
   synchronize, in case the data pertains to separate communication sessions, the bursts such that the bursts of a first of the separate communication sessions at least partially overlap with the bursts of at least a second of the separate communication sessions.

6. The network node according to claim 4, the processing circuit further being configured to accumulate the data received the mobile terminal in the buffer to form bursts of a desired length, and, to control the period between bursts, concatenating at least two buffered data subsets to form a burst to be delivered to the mobile terminal.

7. The network node according to claim 4, said network node being one of: a radio base station (RBS), a base transceiver station (BTS), a NodeB, an eNodeB, a radio network controller (RNC), a base station controller (BSC), a Hypertext Transfer Protocol (HTTP) server, or a proxy server.

8. A non-transitory computer readable medium storing a computer program comprising computer program instructions that, when executed by a processor of a network node, configure the network node to control data to be delivered to a mobile terminal, said computer program comprising program instructions configuring the network node to:
   receive an indication that a data download cap has been reached in a current download quota period, for a subscription associated with the mobile terminal; and
   responsive to receiving the indication, throttle further data downloads to the mobile terminal during a remaining portion of the current quota period, based on:
      buffering data received for delivery to the mobile terminal;
      delivering the buffered data to the mobile terminal in bursts; and
      controlling the period between the bursts in order to control transition by the mobile terminal into a lower-power state of operation between the bursts.

* * * * *